(12) United States Patent
Tanizoe et al.

(10) Patent No.: US 7,499,086 B2
(45) Date of Patent: Mar. 3, 2009

(54) IMAGE SIGNAL PROCESSING APPARATUS, IMAGE SIGNAL PROCESSING CIRCUIT, IMAGE SIGNAL PROCESSING METHOD, PROGRAM, AND RECORDING MEDIUM

(75) Inventors: Yukihiro Tanizoe, Osaka (JP); Yasutoshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 10/510,291

(22) PCT Filed: May 2, 2003

(86) PCT No.: PCT/JP03/05596

§ 371 (c)(1),
(2), (4) Date: Oct. 6, 2004

(87) PCT Pub. No.: WO03/096702

PCT Pub. Date: Nov. 20, 2003

(65) Prior Publication Data

US 2005/0168600 A1    Aug. 4, 2005

(30) Foreign Application Priority Data

May 8, 2002  (JP) .............................. 2002-132683
Oct. 8, 2002  (JP) .............................. 2002-294490

(51) Int. Cl.
*H04N 9/68* (2006.01)
(52) U.S. Cl. ...................................... 348/234
(58) Field of Classification Search ........................ None
See application file for complete search history.

(56) References Cited

U.S. PATENT DOCUMENTS 5,457,447 A   10/1995   Ghaem et al.
5,852,468 A   12/1998   Okada

FOREIGN PATENT DOCUMENTS

| EP | 0 173 306 A1 | 3/1986 |
|---|---|---|
| EP | 1 187 491 A2 | 3/2002 |
| JP | 54-107623 A | 8/1979 |
| JP | 01-176189 | 7/1989 |
| JP | 07-024423 | 1/1995 |
| JP | 08-070466 | 3/1996 |
| JP | 08-237672 | 9/1996 |
| JP | 08-277672 | 10/1996 |
| JP | 11-004454 A | 1/1999 |
| JP | 2000-197067 A | 7/2000 |

OTHER PUBLICATIONS

International Search Report for application No. PCT/JP03/05596 dated Sep. 16, 2003.
Supplementary European Search Report for EP 03 72 5726, dated Oct. 13, 2006.

*Primary Examiner*—Sinh N Tran
*Assistant Examiner*—Anthony J Daniels
(74) *Attorney, Agent, or Firm*—RatnerPrestia

(57) ABSTRACT

An image signal processing apparatus comprises an image capturing element which performs image capturing while utilizing a plurality types of color filters which are arranged based on repetition of a pattern determined in advance, a color change detecting part which detects a color change regarding the result of the image capturing while considering the pattern, and an adder and a core processing part which generate a luminance signal regarding the result of the image capturing based on the result of color change detection.

15 Claims, 16 Drawing Sheets

Fig. 2

| Mg | Gr |
|----|----|
| Ye | Cy |
| Gr | Mg |
| Ye | Cy |

Fig. 4

| | |
|---|---|
| Line2 → | 1 | 1 |
| Line3 → | -1 | -1 |
| Line4 → | -1 | -1 |
| Line5 → | 1 | 1 |

Fig. 5 (a)

| | |
|---|---|
| Line2 → | 0 | 0 |
| Line3 → | 2 | 2 |
| Line4 → | 2 | 2 |
| Line5 → | 0 | 0 |

WHERE $2 \times th < |in|$ IS SATISFIED

Fig. 5 (b)

| | |
|---|---|
| Line2 → | 1/3 | 1/3 |
| Line3 → | 5/3 | 5/3 |
| Line4 → | 5/3 | 5/3 |
| Line5 → | 1/3 | 1/3 |

WHERE $|in| = 1.5 \times th$ IS SATISFIED

Fig. 5 (c)

| | |
|---|---|
| Line2 → | 1 | 1 |
| Line3 → | 1 | 1 |
| Line4 → | 1 | 1 |
| Line5 → | 1 | 1 |

WHERE $|in| < th$ IS SATISFIED

Fig. 6

|     | m-2 | m-1 | m | m+1 | m+2 | m+3 |
|-----|-----|-----|---|-----|-----|-----|
| n-2 | Gr (m-2, n-2) | Mg (m-1, n-2) | Gr (m, n-2) | Mg (m+1, n-2) | Gr (m+2, n-2) | Mg (m+3, n-2) |
| n-1 | Ye (m-2, n-1) | Cy (m-1, n-1) | Ye (m, n-1) | Cy (m+1, n-1) | Ye (m+2, n-1) | Cy (m+3, n-1) |
| n   | Mg (m-2, n) | Gr (m-1, n) | Mg (m,n) | Gr (m+1, n) | Mg (m+2, n) | Gr (m+3, n) |
| n+1 | Ye (m-2, n+1) | Cy (m-1, n+1) | Ye (m, n+1) | Cy (m+1, n+1) | Ye (m+2, n+1) | Cy (m+3, n+1) |
| n+2 | Gr (m-2, n+2) | Mg (m-1, n+2) | Gr (m, n+2) | Mg (m+1, n+2) | Gr (m+2, n+2) | Mg (m+3, n+2) |
| n+3 | Ye (m-2, n+3) | Cy (m-1, n+3) | Ye (m, n+3) | Cy (m+1, n+3) | Ye (m+2, n+3) | Cy (m+3, n+3) |

Fig. 7

|  | m-2 | m-1 | m | m+1 | m+2 | m+3 |
|---|---|---|---|---|---|---|
| n-2 | 0 | 1 | 0 | 0 | 0 | 0 |
| n-1 | 1 | 0 | 1 | 0 | 0 | 0 |
| n | 1 | 0 | 1 | 0 | 0 | 0 |
| n+1 | 1 | 0 | 1 | 0 | 0 | 0 |
| n+2 | 0 | 1 | 0 | 0 | 0 | 0 |
| n+3 | 1 | 0 | 1 | 0 | 0 | 0 |

|   | m-2 | m-1 | m | m+1 | m+2 | m+3 |
|---|---|---|---|---|---|---|
| n-2 | G0 | M0 | G1 | M2 | G3 | M3 |
| n-1 | Y0 | C0 | Y1 | C2 | Y3 | C3 |
| n | M0 | G0 | M1 | G2 | M3 | G3 |
| n+1 | Y0 | C0 | Y1 | C2 | Y3 | C3 |
| n+2 | G0 | M0 | G1 | M2 | G3 | M3 |
| n+3 | Y0 | C0 | Y1 | C2 | Y3 | C3 |

| R | Gr |
|---|----|
| Gr | B |

Fig. 11

|   | m-2 | m-1 | m | m+1 | m+2 | m+3 |
|---|---|---|---|---|---|---|
| n-2 | Gr (m-2, n-2) | R (m-1,n-2) | Gr (m,n-2) | R (m+1,n-2) | Gr (m+2,n-2) | R (m+3,n-2) |
| n-1 | B (m-2,n-1) | Gr (m-1,n-1) | B (m,n-1) | Gr (m+1,n-1) | B (m+2,n-1) | Gr (m+3,n-1) |
| n | Gr (m-2,n) | R (m-1,n) | Gr(m,n) | R (m+1,n) | Gr (m+2,n) | R (m+3,n) |
| n+1 | B (m-2,n+1) | Gr (m-1,n+1) | B (m,n+1) | Gr(m+1, n+1) | B (m+2,n+1) | Gr (m+3,n+1) |
| n+2 | Gr (m-2,n+2) | R (m-1,n+2) | Gr (m,n+2) | R (m+1,n+2) | Gr (m+2,n+2) | R (m+3,n+2) |
| n+3 | B (m-2,n+3) | Gr (m-1,n+3) | B (m,n+3) | Gr (m+1,n+3) | B (m+2,n+3) | Gr (m+3,n+3) |

|  | m-2 | m-1 | m | m+1 | m+2 | m+3 |
|---|---|---|---|---|---|---|
| n-2 |  | 0 | 0 | 0 | 0 | 0 |
| n-1 | 0 |  | 1 | 0 | 1 | 0 |
| n | 0 | 1 | 0 | 0 | 0 | 0 |
| n+1 | 0 | 0 | 0 |  | 1 | 0 |
| n+2 | 0 | 1 | 0 | 1 |  | 0 |
| n+3 | 0 | 0 | 0 | 0 | 0 |  |

| | | | |
|---|---|---|---|
| 0 | 1 | 0 | 0 |
| 1 | 0 | -2 | 0 |
| 0 | -2 | 0 | 1 |
| 0 | 0 | 1 | 0 |

Line2 →
Line3 →
Line4 →
Line5 →

Fig. 13 (b)

| | | | |
|---|---|---|---|
| 0 | 0 | 1 | 0 |
| 0 | -2 | 0 | 1 |
| 1 | 0 | -2 | 0 |
| 0 | 1 | 0 | 0 |

Line2 →
Line3 →
Line4 →
Line5 →

Fig. 14

| | | | |
|---|---|---|---|
Line2 →| 0 | 0 | 0 | 0 |
Line3 →| 0 | 4 | 4 | 0 |
Line4 →| 0 | 4 | 4 | 0 |
Line5 →| 0 | 0 | 0 | 0 |

Fig. 15 (a)

| | | | |
|---|---|---|---|
| 0 | 0 | 0 | 0 |
| 0 | 4 | 4 | 0 |
| 0 | 4 | 4 | 0 |
| 0 | 0 | 0 | 0 |

Line2, Line3, Line4, Line5

WHERE 2×th < |in| IS SATISFIED

Fig. 15 (b)

| | | | |
|---|---|---|---|
| 0 | 1/3 | 0 | 0 |
| 1/3 | 4 | 10/3 | 0 |
| 0 | 10/3 | 4 | 1/3 |
| 0 | 0 | 1/3 | 0 |

Line2, Line3, Line4, Line5

WHERE |in| = 1.5×th IS SATISFIED

Fig. 15 (c)

| | | | |
|---|---|---|---|
| 0 | 0 | 1/3 | 0 |
| 0 | 10/3 | 4 | 1/3 |
| 1/3 | 4 | 10/3 | 0 |
| 0 | 1/3 | 0 | 0 |

Line2, Line3, Line4, Line5

WHERE |in| = 1.5×th IS SATISFIED

Fig. 15 (d)

| | | | |
|---|---|---|---|
| 0 | 1 | 0 | 0 |
| 1 | 4 | 2 | 0 |
| 0 | 2 | 4 | 1 |
| 0 | 0 | 1 | 0 |

Line2, Line3, Line4, Line5

WHERE |in| ≦ th IS SATISFIED

Fig. 15 (e)

| | | | |
|---|---|---|---|
| 0 | 0 | 1 | 0 |
| 0 | 2 | 4 | 1 |
| 1 | 4 | 2 | 0 |
| 0 | 1 | 0 | 0 |

Line2, Line3, Line4, Line5

WHERE |in| ≦ th IS SATISFIED

Fig. 16 (a)

| 0 | 0 | 0 | 0 | 0 | 1 | 0 | 1 |
|---|---|---|---|---|---|---|---|
| 0 | 0 | 0 | 0 | -1 | 0 | -1 | 0 |
| 0 | -1 | 0 | -1 | 0 | 0 | 0 | 0 |
| 1 | 0 | 1 | 0 | 0 | 0 | 0 | 0 |

Fig. 16 (b)

| 0 | 0 | 0 | 0 | 1 | 0 | 1 | 0 |
|---|---|---|---|---|---|---|---|
| 0 | 0 | 0 | 0 | 0 | -1 | 0 | -1 |
| -1 | 0 | -1 | 0 | 0 | 0 | 0 | 0 |
| 0 | 1 | 0 | 1 | 0 | 0 | 0 | 0 |

Fig. 16 (c)

| 0 | 1 | 0 | 1 | 0 | 0 | 0 | 0 |
|---|---|---|---|---|---|---|---|
| -1 | 0 | -1 | 0 | 0 | 0 | 0 | 0 |
| 0 | 0 | 0 | 0 | 0 | -1 | 0 | -1 |
| 0 | 0 | 0 | 0 | 1 | 0 | 1 | 0 |

Fig. 16 (d)

| 1 | 0 | 1 | 0 | 0 | 0 | 0 | 0 |
|---|---|---|---|---|---|---|---|
| 0 | -1 | 0 | -1 | 0 | 0 | 0 | 0 |
| 0 | 0 | 0 | 0 | -1 | 0 | -1 | 0 |
| 0 | 0 | 0 | 0 | 0 | 1 | 0 | 1 | ers is a complementary color filter arrangement as that shown in FIG. 2 formed by repetition of two horizontal pixels and four vertical pixels in which a magenta and a green color filters are alternately arranged in this order on a first line along the horizontal direction, a yellow and a cyan color filters are alternately arranged in this order on a second line along the horizontal direction, a green and a magenta color filters are alternately arranged in this order on a third line along the horizontal direction and a yellow and a cyan color filters are alternately arranged in this order on a fourth line along the horizontal direction.

IMAGE SIGNAL PROCESSING APPARATUS, IMAGE SIGNAL PROCESSING CIRCUIT, IMAGE SIGNAL PROCESSING METHOD, PROGRAM, AND RECORDING MEDIUM

This application is a U.S. National Phase Applicaiton of PCT international application PCT/JP03/05596.

FIELD OF THE INVENTION

The present invention relates to an image signal processing apparatus, an image signal processing circuit, an image signal processing method, a program and a recording medium which are used in a digital still camera, a movie, etc.

BACKGROUND OF THE INVENTION

In a digital still camera, a movie, etc., an image capturing element such as a CCD (Charge Coupled Device) is used.

Color separation filters having a predetermined repetition pattern for every pixel is attached for coloring to a surface of an image capturing element.

Various types of such color separation filters are known.

One of filter arrangements for widely used color separation filters is a complementary color filter arrangement as that shown in FIG. 2 formed by repetition of two horizontal pixels and four vertical pixels in which a magenta and a green color filters are alternately arranged in this order on a first line along the horizontal direction, a yellow and a cyan color filters are alternately arranged in this order on a second line along the horizontal direction, a green and a magenta color filters are alternately arranged in this order on a third line along the horizontal direction and a yellow and a cyan color filters are alternately arranged in this order on a fourth line along the horizontal direction.

This filter arrangement will be hereinafter referred to as a color difference line sequential arrangement.

A method of generating a luminance signal from an output from an image capturing element comprising color separation filters having the color difference line sequential arrangement may be, in general, a method requiring addition of two vertical pixels×two horizontal pixels (See Japanese Patent Application Laid-Open Gazette No. H8-070466 (page 2, FIG. 4).).

The entire disclosure of Japanese Patent Application Laid-Open Gazette No. H8-070466 is incorporated herein by reference in its entirety.

One of widely used filter arrangements other than the color difference line sequential arrangement is a primary color filter arrangement as that shown in FIG. 10 formed by repetition of two horizontal pixels and two vertical pixels in which color filters for red and green are alternately arranged in this order on a first line along the horizontal direction and color filters for green and blue are alternately arranged in this order on a second line along the horizontal direction.

This filter arrangement will be hereinafter referred to as a primary color Bayer arrangement.

Methods of generating a luminance signal from an output from an image capturing element comprising color filters having the primary color Bayer arrangement include a method requiring addition of two vertical pixels×two horizontal pixels.

Other method of generating a luminance signal from an output from an image capturing element comprising color separation filters having the primary color Bayer arrangement may be a method which requires addition of only green signals within areas consisting of two vertical pixels×two horizontal pixels to thereby generate a high-frequency luminance component (See Japanese Patent Application Laid-Open Gazette No. H8-237672 (page 7, FIGS. 10 through 13).).

The entire disclosure of Japanese Patent Application Laid-Open Gazette No. H8-237672 is incorporated herein by reference in its entirety.

However, where a color separation filter arrangement which is the color difference line sequential arrangement is used, generation of a luminance signal by means of addition of signals representing two vertical pixels×two horizontal pixels gives rise to a problem that a dot-like pseudo signal is generated during image capturing of an object which shows dramatic color changes in the horizontal direction.

For instance, FIG. 6 is a drawing which shows a part of the color filter arrangement which is the color difference line sequential arrangement, and the colors of an object change between the column m and the column m+1.

Ye=Mg=1 and Gr=Cy=0 on the right hand side to the point of change, while Ye=Mg=Gr=Cy=0 on the right hand side to the point of change.

FIG. 7 shows outputs from an image capturing element corresponding to the locations of the respective color filters.

The addition value at two vertical pixels×two horizontal pixels denoted by coordinates (m, n−1), (m+1, n−1), (m, n) and (m+1, n) is two, and the addition value at pixels denoted by coordinates (m, n+1), (m+1, n+1), (m, n+2) and (m+1, n+2) is one.

A luminance signal thus changes even though the object does not show any change in luminance along the vertical direction.

The inventor of the present invention has noticed that this would manifest itself as a dot-like pseudo signal and serve as a factor remarkably degrading the image capturing quality.

In a similar manner, use of color separation filters having the primary color Bayer arrangement leads to a problem that during image capturing of an object whose colors change dramatically in an oblique direction (diagonal direction), a dot-like pseudo signal is generated.

For example, FIG. 11 is a drawing which shows a part of a color filter arrangement which is the primary color Bayer arrangement, and the colors of an object change over a diagonal line which connect the coordinates (m−2, n−2) and (m+3, n+3).

R=Gr=0 and B=1 above and on the right hand side to the point of change, while B=Gr=0 and R=1 below and on the left hand side to the point of change.

FIG. 12 shows outputs from an image capturing element corresponding to the locations of the respective color filters.

The addition value at two vertical pixels×two horizontal pixels denoted by coordinates (m−2, n−2), (m−1, n−2), (m−2, n−1) and (m−1, n−1) is zero, and the addition value at pixels denoted by coordinates (m−1, n−1), (m, n−1) (m−1, n) and (m, n) is two.

A luminance signal thus changes even though the object does not show any change in luminance along the oblique direction.

The inventor of the present invention has noticed that this would manifest itself as a dot-like pseudo signal and serve as a factor remarkably degrading the image capturing quality.

Although a dot-like pseudo signal described above is not generated when a high-frequency luminance signal is generated using only green signals within areas consisting of two vertical pixels×two horizontal pixels, since sampling intervals particularly in an oblique direction become twice as large as those which arise when red, green and blue are all used, the resolution in the oblique direction deteriorates.

SUMMARY OF THE INVENTION

Considering the problems above with the conventional techniques, the present invention aims at providing an image signal processing apparatus, an image signal processing circuit, an image signal processing method, a program and a recording medium with which it is possible to obtain a luminance signal in which generation of a pseudo signal is better suppressed.

The 1st aspect of the present invention is an image signal processing apparatus, comprising:

image capturing means of performing image capture using a plurality types of color filters which are arranged based on repetition of a pattern determined in advance;

color change detecting means of performing color change detection regarding the result of said image capture;

luminance change detecting means of performing luminance change detection regarding the result of said image capture; and luminance signal generating means of performing luminance signal generation regarding the result of said image capture based on the result of said color change detection and the result of said luminance change detection.

The 2nd aspect of the present invention is the image signal processing apparatus of the 1st aspect of the present invention, wherein said color change detection is performed with respect to a predetermined direction corresponding to said pattern, and said luminance signal is generated such that a pseudo signal is suppressed at a color change point where said detected color change with respect to said predetermined direction exceeds a predetermined level regarding said luminance change.

The 3rd aspect of the present invention is the image signal processing apparatus of the 2nd aspect of the present invention, wherein said pattern is a pattern having two pixels in the horizontal direction and four pixels in the vertical direction so as to arrange a color filter of magenta and a color filter of green in this order on a first line in the horizontal direction, a color filter of yellow and a color filter of cyan in this order on a second line in the horizontal direction, a color filter of green and a color filter of magenta in this order on a third line in the horizontal direction and a color filter of yellow and a color filter of cyan in this order on a fourth line in the horizontal direction, and said predetermined direction is the horizontal direction.

The 4th aspect of the present invention is the image signal processing apparatus of the 3rd aspect of the present invention, wherein said color change detection is performed in accordance with a change as for said magenta in the horizontal direction and a change as for said green in the horizontal direction.

The 5th aspect of the present invention is the image signal processing apparatus of the 4th aspect of the present invention, wherein said color change detection is performed further in accordance with a change as for said yellow in the vertical direction and a change as for said cyan in the vertical direction.

The 6th aspect of the present invention is the image signal processing apparatus of the 4th aspect of the present invention, wherein said color change detection is performed further in accordance with a change as for said magenta in the vertical direction and a change as for said green in the vertical direction.

The 7th aspect of the present invention is the image signal processing apparatus of the 2nd aspect of the present invention, wherein said pattern is a pattern having two pixels in the horizontal direction and two pixels in the vertical direction so as to arrange a color filter of red and a color filter of green in this order on a first line in the horizontal direction and a color filter of green and a color filter of blue in this order on a second line in the horizontal direction, and said predetermined direction is the direction of a diagonal line.

The 8th aspect of the present invention is the image signal processing apparatus of the 7th aspect of the present invention, wherein said color change detection is performed in accordance with a change as for said red in the direction of the diagonal line and a change as for said blue in the direction of the diagonal line.

The 9th aspect of the present invention is the image signal processing apparatus of the 7th aspect of the present invention, wherein calculation for suppression of said pseudo signal is performed in accordance with a change as for said red in the direction of the diagonal line and a change as for said blue in the direction of the diagonal line.

The 10th aspect of the present invention is an image signal processing circuit, comprising:

color change detecting means of performing color change detection regarding the result of image capture which is performed using a plurality of types of color filters which are arranged based on repetition of a pattern determined in advance;

luminance change detecting means of performing luminance change detection regarding the result of said image capture; and luminance signal generating means of performing luminance signal generation regarding the result of said image capture based on the result of said color change detection and the result of said luminance change detection.

The 11th aspect of the present invention is an image signal processing method, comprising:

a color change detecting step of performing color change detection regarding the result of image capture which is performed using a plurality of types of color filters which are arranged based on repetition of a pattern determined in advance;

a luminance change detecting step of performing luminance change detection regarding the result of said image capture; and a luminance signal generating step of performing luminance signal generation regarding the result of said image capture based on the result of said color change detection and the result of said luminance change detection.

The 12th aspect of the present invention is a program which makes a computer execute the color change detecting step of performing color change detection regarding the result of image capture which is performed using a plurality of types of color filters which are arranged based on repetition of a pattern determined in advance, a luminance change detecting step of performing luminance change detection regarding the result of said image capture, and the luminance signal generating step of performing luminance signal generation regarding the result of said image capture based on the result of said color change detection and the result of said luminance change detection, which are of the image signal processing method of the 11th aspect of the present invention.

The 13th aspect of the present invention is a recording medium which holds the program of the 12th aspect of the present invention and which can be processed on a computer.

BRIEF DESCRIPTION OF THE DRAWINGS

FIG. 2 is a drawing which shows a color filter arrangement which an image capturing element 1 according to the first preferred embodiment of the present invention has;

FIG. 4 is a drawing which shows tap coefficients used by filtering which is performed on an output from the image capturing element 1 within an input signal to the core processing part 20 according to the first preferred embodiment of the present invention;

FIG. 5 is a drawing which shows tap coefficients used by filtering which is performed on an output from the image capturing element 1 within an output signal from an adaptive low-pass filter part 21 in an instance that input signals in and th to the core processing part 20 according to the first preferred embodiment of the present invention change;

FIG. 6 is a drawing which shows a part of the color filter arrangement which the image capturing element 1 according to the first preferred embodiment of the present invention has;

FIG. 7 is a drawing which shows an example of outputs from the image capturing element 1 of the first preferred embodiment of the present invention corresponding to the locations of the respective color filters;

FIG. 8 is a drawing which shows an example of outputs from the image capturing element 1 of the first preferred embodiment of the present invention corresponding to the locations of the respective color filters;

FIG. 10 is a drawing which shows a color filter arrangement which an image capturing element 30 according to the second preferred embodiment of the present invention has;

FIG. 11 is a drawing which shows a part of the color filter arrangement which the image capturing element 30 according to the second preferred embodiment of the present invention has;

FIG. 12 is a drawing which shows an example of outputs from the image capturing element 30 of the second preferred embodiment of the present invention corresponding to the locations of the respective color filters;

FIG. 13 is a drawing which shows tap coefficients used by filtering which is performed by a luminance change detecting part 31 according to the second preferred embodiment of the present invention;

FIG. 14 is a drawing which shows tap coefficients used by filtering which is performed on an output from the image capturing element 30 within an output from a 1-pixel delaying part 37 according to the second preferred embodiment of the present invention;

FIG. 15 is a drawing which shows tap coefficients used by filtering which is performed by an adaptive low-pass filter part 33 according to the second preferred embodiment of the present invention; and FIG. 16 is a drawing which shows tap coefficients used by filtering which is performed by a color change detecting part 32 according to the second preferred embodiment of the present invention.

EXPLANATION OF THE REFERENCE SYMBOLS

Figure 1:
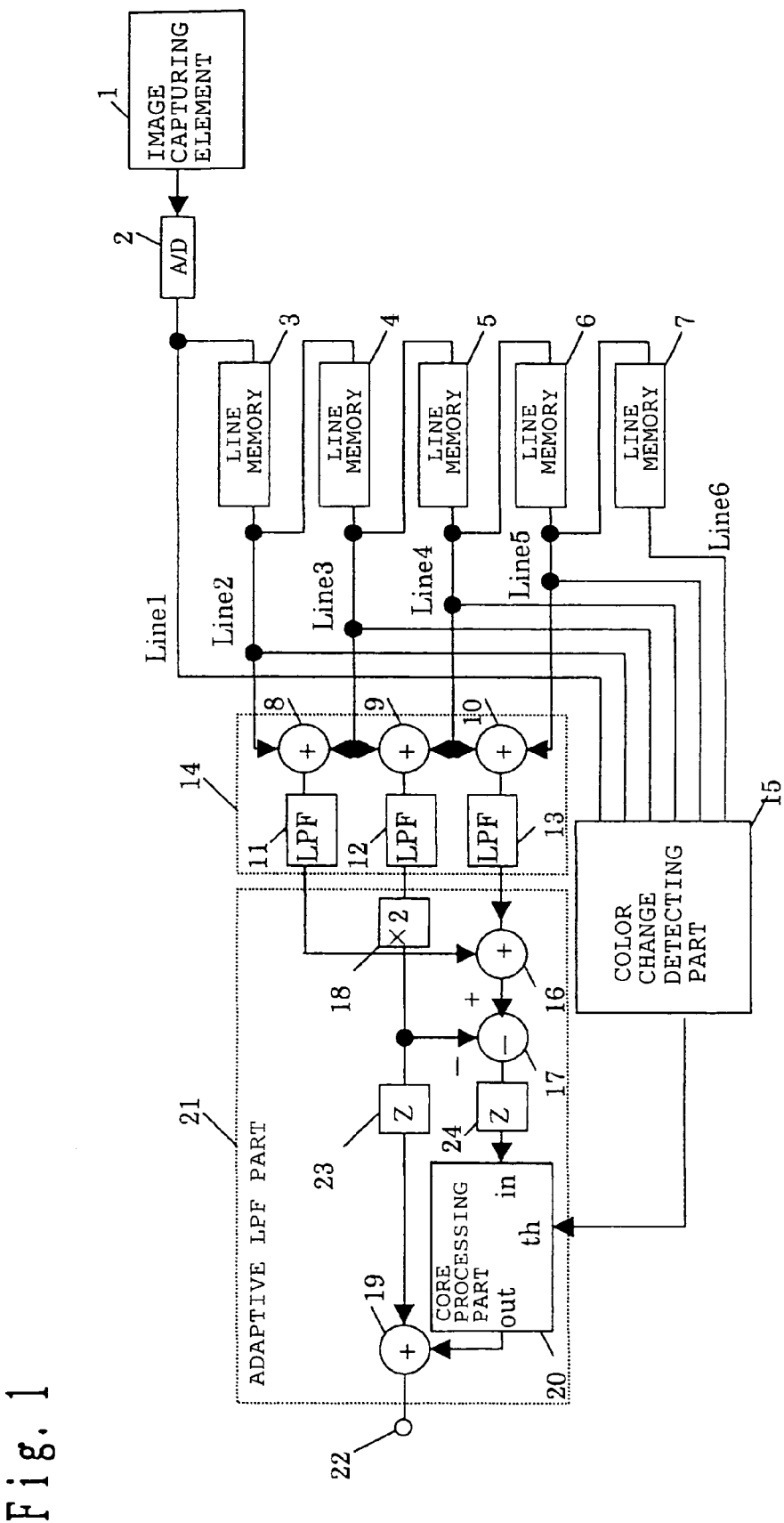
FIG. 1 is a block diagram which shows the structure of an image signal processing apparatus according to a first preferred embodiment of the present invention.

1 image capturing element
2 A/D conversion part
3 to 7 line memory
14 luminance signal generating part
15 color change detecting part
21 adaptive low-pass filter part
22 luminance signal output terminal

BEST MODE FOR IMPLEMENTING THE INVENTION

For better understanding of the present invention, points of the invention will be first described briefly.

As described above, during conventional image signal processing, a pseudo signal is sometimes generated in a luminance signal at a color change point at which a color greatly changes in a predetermined direction in accordance with a pattern which is used for a color filter arrangement.

The inventor of the present invention has found that (1) by detecting a color change considering such a pattern mentioned above, and (2) by generating a luminance signal appropriately based on the result of the color change detection, it was possible to favorably suppress generation of such a pseudo signal.

To be more specific, where a color separation filter comprises a color filter (See FIG. 2.) which is arranged using the color difference line sequential arrangement, (1) a color change in the horizontal direction may be detected by checking a difference between output values representing neighboring pixels in a proper color filter, and (2) a luminance signal may be generated such that a pseudo signal will be suppressed at a color change point at which a color change in the horizontal direction is beyond a predetermined level.

In a simple image (See FIG. 7.) which is expressed by different solid colors between the left-hand half and the right-hand half on a screen for instance, such a color change point at which a color change in the horizontal direction exceeds a predetermined level is created on a boundary line between these.

Generation of a luminance signal as that described above particularly remarkably improves the quality of displaying such a simple image (or an image which contains such a simple image as a partial image).

Preferred embodiments of the present invention will now be described with reference to the associated drawings.

FIRST PREFERRED EMBODIMENT

First, the structure of an image signal processing apparatus according to this preferred embodiment will be described with reference mainly to FIG. 1 which is a block diagram of the image signal processing apparatus according to this preferred embodiment.

In FIG. 1, denoted at 1 is an image capturing element, denoted at 2 is an A/D conversion part, denoted at 3 through 7 are line memories, denoted at 14 is a luminance signal generating part, denoted at 15 is a color change detecting part, denoted at 21 is an adaptive low-pass filter part, and denoted at 22 is a luminance signal output terminal.

Further, in FIG. 1, denoted at 8 through 10 are adders and denoted at 11 through 13 are low-pass filter parts. These form the luminance signal generating part 14.

In addition, in FIG. 1, denoted at 16 and 19 are adders, denoted at 17 is a subtractor, denoted at 18 is a multiplier, denoted at 20 is a core processing part, and denoted at 23 and 24 are 1-pixel delaying parts. These form the adaptive low-pass filter part 21.

The adaptive low-pass filter part 21 is means which adaptively executes low-pass filtering of an output signal from the image capturing element 1 in accordance with an output from the color change detecting part 15 and which accordingly generates a luminance signal in which a pseudo signal arising at a color change point is suppressed.

Further, the adaptive low-pass filter part 21 comprises the subtractor 17 which is for detection of a luminance change from the output signal from the image capturing element 1, and therefore can control a low-pass filter characteristic in accordance with the result of comparison of an output from the subtractor 17 delayed by the 1-pixel delaying part 24 with an output from the color change detecting part 15.

The image capturing element 1 corresponds to image capturing means of the present invention, the color change detecting part 15 corresponds to color change detecting means of the present invention, and means which includes the adder 19 and the core processing part 20 corresponds to luminance signal generating means of the present invention.

Operations of the image signal processing apparatus according to this preferred embodiment will now be described. While describing the operations of the image signal processing apparatus according to this preferred embodiment, a preferred embodiment regarding the image signal processing method according to the present invention will also be described (This is true with other preferred embodiments.).

Figure 2:
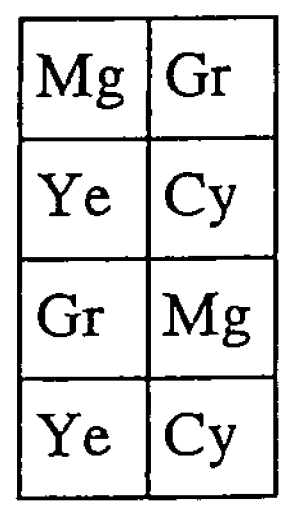

The image capturing element 1 comprises in a surface complementary color filters which have an arrangement as that shown in FIG. 2, and for every horizontal line, outputs complementary colors of magenta, green, yellow and cyan in accordance with the filter colors.

The output signal from the image capturing element 1 is digitized by the A/D conversion part 2, delayed while going through the line memories 3 to 7, and inputted to the luminance signal generating part 14 and the color change detecting part 15.

The line memories 3 to 7 delay and output signals from the image capturing element 1 corresponding to one horizontal line.

Hence, the color change detecting part 15 receives complementary color signals for six lines at the same time, while the luminance signal generating part 14 receives complementary color signals for four lines at the same time.

Within the luminance signal generating part 14, after the adders 8 through 10 add the complementary color signals which are adjacent in the vertical direction, the low-pass filter parts 11 through 13 add the signals which are adjacent in the horizontal direction.

In consequence, the addition values of the complementary color signals covering two vertical pixels×two horizontal pixels for three lines are outputted at the same time as a luminance signal.

An output from the luminance signal generating part 14 contains a pseudo signal arising at a color change point in the horizontal direction described above in relation to the conventional example.

In this preferred embodiment, the output from the luminance signal generating part 14 is fed to the adaptive low-pass filter part 21.

Within the adaptive low-pass filter part 21, the adder 16 adds the signals representing the top and the bottom lines among the outputs corresponding to the three lines from the luminance signal generating part 14, and the multiplier 18 doubles the signal corresponding to the central line.

An output of the multiplier 18 is subtracted from an output of the adder 16 by the subtractor 17, and the difference is delayed by the 1-pixel delaying part 24 and inputted to the core processing part 20.

Figure 4:
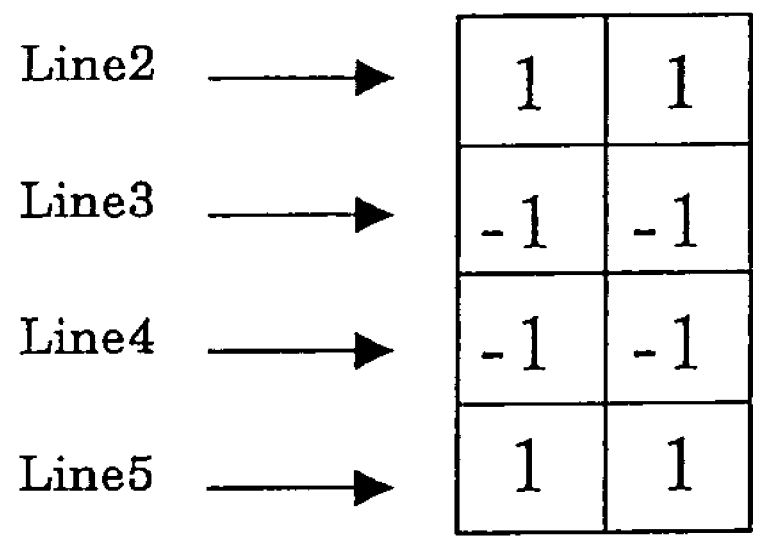

FIG. 4 shows tap coefficients used by filtering which is performed on the output from the image capturing element 1 within the input signal of the core processing part 20.

The filter shown in FIG. 4 is a filter which detects a luminance edge in the vertical direction, and at a color change point in the horizontal direction, serves as a filter which detects the level of a pseudo signal.

To be more specific, such filtering is processing in which output values representing the respective pixels of the image capturing element 1, each being multiplied by corresponding tap coefficients, are added together, and thereby an output value of a signal which is generated for the central location of the filter is calculated (This will remain true in the following.)

Figure 3:
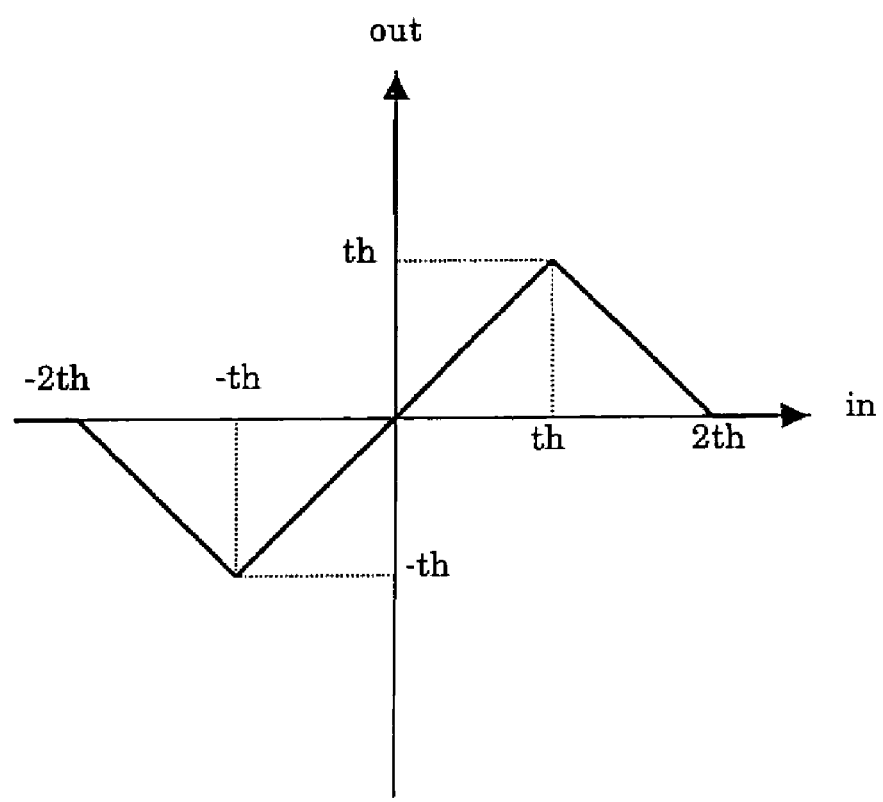
FIG. 3 is a drawing which shows a relationship between an input and an output signals of a core processing part 20 according to the first preferred embodiment of the present invention.

FIG. 3 is a drawing which shows a relationship between an input and an output of the core processing part 20.

Inside the core processing part 20, the output th from the color change detecting part 15 (threshold value) is compared with the input in which is fed to the core processing part 20 after outputted from the subtractor 17.

Zero is outputted when in<−2th and 2th<in are satisfied, −2th—in is outputted when −2th<in<th is satisfied, in is outputted when −th<in<th is satisfied, and 2th—in is outputted when th<in<2th is satisfied.

An output from the core processing part 20 is added by the adder 19 to an output from the multiplier 18 delayed by the 1-pixel delaying part 23, and the sum is outputted to the luminance signal output terminal 22.

FIG. 5 shows tap coefficients for filtering which is performed on the output from the image capturing element 1 within the output signal from the adaptive low-pass filter part 21.

FIG. 5(a) shows tap coefficients for where 2×th<|in| is satisfied, FIG. 5(b) shows tap coefficients for where |in|=1.5×th is satisfied, and FIG. 5(c) shows tap coefficients for where |in|<th is satisfied.

The larger th is relative to |in|, the narrower the frequency band demanded by low-pass filtering becomes along the vertical direction and the larger the effect of suppressing a pseudo signal at a color change point along the horizontal direction becomes.

When the filter shown in FIG. 5(c) is used on signals located at the columns m and m+1 between which the boundary portion of the colors exists in FIG. 7 for instance, the output value is three at any position and it is found that a pseudo signal is suppressed completely.

Hence, the color change detecting part 15 may generate such an output th satisfying |in|<th at color change points along the horizontal direction. However, if 2×th<|in| is not satisfied other than at the horizontal-direction color change points, malfunction occurs.

Operations of the color change detecting part 15 will now be described in more detail.

FIG. 8 is a drawing which shows output values from the image capturing element 1 at the respective pixels as they are when there is a change from Mg=M0, Gr=G0, Ye=Y0 and Cy=C0 to Mg=M3, Gr=G3, Ye=Y3 and Cy=C3 between the columns m and m+1 shown in FIG. 6.

Nevertheless, considering an influence of a lens (not shown), an aperture of the image capturing element 1, a quartz optical low-pass filter (not shown), etc., an instance that the column m is a halftone color represented by Mg=M1, Gr=G1, Ye=Y1 and Cy=C1 and the column m+1 is a halftone color represented by Mg=M2, Gr=G2, Ye=Y2 and Cy=C2 will be described.

With respect to Mg for example, an instance that M0<M1<M2<M3 or M0>M1>M2>M3 is satisfied will be described. As for Gr, Ye and Cy as well, an instance that a similar relationship is satisfied will be described.

At this stage, the input in to the core processing part 20 at the color boundary line is as expressed by (Formula 1) (Of course, the first equal sign is generally an equal sign which defines in. This will remain true in the following.)

(Formula 1)

$$in = Ye(m, n-1) + Cy(m+1, n-1) - Mg(m, n) - Gr(m+1, n) - Ye(m, n+1)Cy(m+1, n+1) + Gr(m, n+2) + Mg(m+1, n+2) = G1 - G2 + M2 - M1$$

This means that the magenta and the green signals have given rise to a pseudo signal at the boundary line representing the color changes in the horizontal direction.

In this situation, the color change detecting part 15 may calculate th in accordance for instance with (Formula 2).

$$th = \text{Max}(|Mg(m, n) - Mg(m+2, n)|, |Mg(m-1, n+2) - Mg(m+1, n+2)|) + \text{Max}(|Gr(m-1, n) - Gr(m+1, n)|, |Gr(m, n+2) - Gr(m+2, n+2)|) = \text{Max}(|M1-M3|, |M0-M2|) + \text{Max}(|G1-G3|, |G0-G2|)$$

where Max (a, b) denotes a function of selecting the larger one of a and b.

Since M0<M1<M2<M3 or M0>M1>M2>M3 is satisfied and G0<G1<G2<G3 or G0>G1>G2>G3 is satisfied, the relationship th>|in| is always satisfied.

Use of th in accordance with (Formula 2) thus suppresses the pseudo signal at the color change point.

(1) Use of th in accordance with (Formula 2) may sometimes result in a wrong detection in which a luminance change is mistaken for a color change in the horizontal direction.

This therefore may lead to a situation that the adaptive low-pass filter part 21 malfunctions with respect to an object which has a luminance change particularly in an oblique direction (diagonal direction) and the oblique resolution is damaged.

To better suppress occurrence of such malfunction, th may be calculated in accordance with (Formula 3).

$$th = \text{Max}(a, 0)$$

$$a = \text{Max}(|Mg(m, n) - Mg(m+2, n)|, |Mg(m-1, n+2) - Mg(m+1, n+2)|) + \text{Max}(|Gr(m-1, n) - Gr(m+1, n)|, |Gr(m, n+2) - Gr(m+2, n+2)|) - b \times (|2 \times Ye(m, n+1) - Ye(m, n-1) - Ye(m, n+3)| + |2 \times Cy(m+1, n+1) - Cy(m+1, n-1) - Cy(m+1, n+3)|)$$

In (Formula 3), b denotes a coefficient for adjusting the degree of correction and b>0 is satisfied.

In (Formula 3), the calculations for the columns n−1, n+1 and n+3 are indicative of vertical-direction variations of the yellow and the cyan signals in the vertical direction.

In the vertical direction, the yellow and the cyan signals do not change at the color change points which are along the horizontal direction.

Hence, in accordance with (Formula 3), it is possible to suppress occurrence of malfunction in a portion where there is a luminance change in the oblique direction, without influencing suppression of the pseudo signal at the color change points in the horizontal direction.

(2) During detection of the changes of the yellow and the cyan signals in the vertical direction using (Formula 3), it is hard to detect a change at a relatively low frequency, a change which is close to a vertical Nyquist frequency determined by the pixel pitches of the image capturing element, etc.

This may sometimes make it difficult to suppress occurrence of malfunction in a luminance change portion in the oblique direction at such a frequency.

For better suppression of occurrence of such malfunction, variation patterns of the magenta and the green signals in the vertical direction are checked.

When the variation patterns of the magenta and the green signals in the vertical direction are not a pseudo signal pattern at a color change point, it may be determined that this is not a color change point.

For example, the variation patterns of the magenta and the green signals are checked in accordance with (Formula 4).

$$c = \{(Mg(m, n) + Gr(m+1, n)) - (Gr(m, n-2) + Mg(m+1, n-2))\} \times \{(Mg(m, n) + Gr(m+1, n)) - (Gr(m, n+2) + Mg(m+1, n+2))\}$$

When there is a pseudo signal at a color change point, c>0 is satisfied. Therefore, th=0 may be used when c<0 (Of course, th as described above is used as it is when c≧0 is satisfied.), to thereby better suppress occurrence of malfunction of the adaptive low-pass filter part 21.

(3) (Formula 2) through (Formula 4) are arithmetic expressions for where the input in is fed to the core processing part 20 in accordance with (Formula 1).

Considering parallel displacement in the vertical direction, since the magenta and the green rows are replaced with the yellow and the cyan rows for every line, it is necessary to slightly correct (Formula 1) through (Formula 4).

To be more specific, considering parallel displacement one line toward below along the vertical direction, (Formula 1) through (Formula 4) are replaced with (Formula 5) through (Formula 8).

(Formula 5)

$$in = Mg(m, n) + Gr(m+1, n) - Ye(m, n+1) - Cy(m+1, n+1) - Gr(m, n+2) - Mg(m+1, n+2) + Ye(m, n+3) + Cy(m+1, n+3)$$

(Formula 6)

$$th = \text{Max}(|Mg(m, n) - Mg(m+2, n)|, |Mg(m-1, n+2) - Mg(m+1, n+2)|) + \text{Max}(|Gr(m-1, n) - Gr(m+1, n)|, |Gr(m, n+2) - Gr(m+2, n+2)|)$$

(Formula 7)

$$th = \text{Max}(a, 0)\ a = \text{Max}(|Mg(m, n) - Mg(m+2, n)|, |Mg(m-1, n+2) - Mg(m+1, n+2)|) + \text{Max}(|Gr(m-1, n) - Gr(m+1, n)|, |Gr(m, n+2) - Gr(m+2, n+2)|) - b \times (|2 \times Ye(m, n+1) - Ye(m, n-1) - Ye(m, n+3)| + |2 \times Cy(m+1, n+1) - Cy(m+1, n-1) - Cy(m+1, n+3)|)$$

(Formula 8)

$$c = \{(Mg(m, n+2) + Gr(m+1, n+2)) - (Gr(m, n) + Mg(m+1, n))\} \times \{(Mg(m, n+2) + Gr(m+1, n+2)) - (Gr(m, n+4) + Mg(m+1, n+4))\}$$

In this manner, considering parallel displacement one line toward below in the vertical direction, while the coordinate value in the vertical direction appearing in (Formula 5) is equal to the coordinate value in the vertical direction appearing in (Formula 1) as it is with one added to the same, since (Formula 6) and (Formula 7) are respectively the same as (Formula 2) and (Formula 3), the coordinate value in the vertical direction appearing in (Formula 8) is equal to the coordinate value in the vertical direction appearing in (Formula 1) as it is with two added to the same.

In the case of parallel displacement two lines toward below in the vertical direction, the coordinate values in the vertical direction appearing in (Formula 5) through (Formula 8) are equal to the coordinate values in the vertical direction appearing in (Formula 1) through (Formula 4) as they are with two added to the same.

In the case of parallel displacement three lines toward below in the vertical direction, the coordinate value in the vertical direction appearing in (Formula 5) is equal to the coordinate value in the vertical direction appearing in (Formula 1) as it is with three added to the same, the coordinate values in the vertical direction appearing in (Formula 6) and (Formula 7) are equal to the coordinate values in the vertical direction appearing in (Formula 2) and (Formula 3) as they are with two added to the same, and the coordinate value in the vertical direction appearing in (Formula 8) is equal to the coordinate value in the vertical direction appearing in (Formula 1) as it is with four added to the same.

Of course, as for parallel displacement in the horizontal direction as well, (when parallel displacement one line toward the right-hand side is considered), it is necessary to slightly correct (Formula 1) through (Formula 4) in line with similar thinking.

Considering that the color filters according to this embodiment are arranged based on repetition of the pattern which includes two pixels in the horizontal direction and four pixels in the vertical direction, other situations than the one above can be handled like the situation described above.

By means of the structure and the operations above, at the luminance signal output terminal 22, a luminance signal in which a pseudo signal arising at a color change point is suppressed is outputted.

Further, even when there is an oblique luminance change, such a signal is obtained which is free from a resolution deterioration which is attributable to malfunction of the adaptive low-pass filter part 21.

SECOND PREFERRED EMBODIMENT

First, the structure of an image signal processing apparatus according to this preferred embodiment will be described with reference mainly to FIG. 9 which is a block diagram of the image signal processing apparatus according to this preferred embodiment.

This preferred embodiment requires use of a color filter arrangement which is the primary color Bayer arrangement (instead of the color difference line sequential arrangement).

Figure 9:
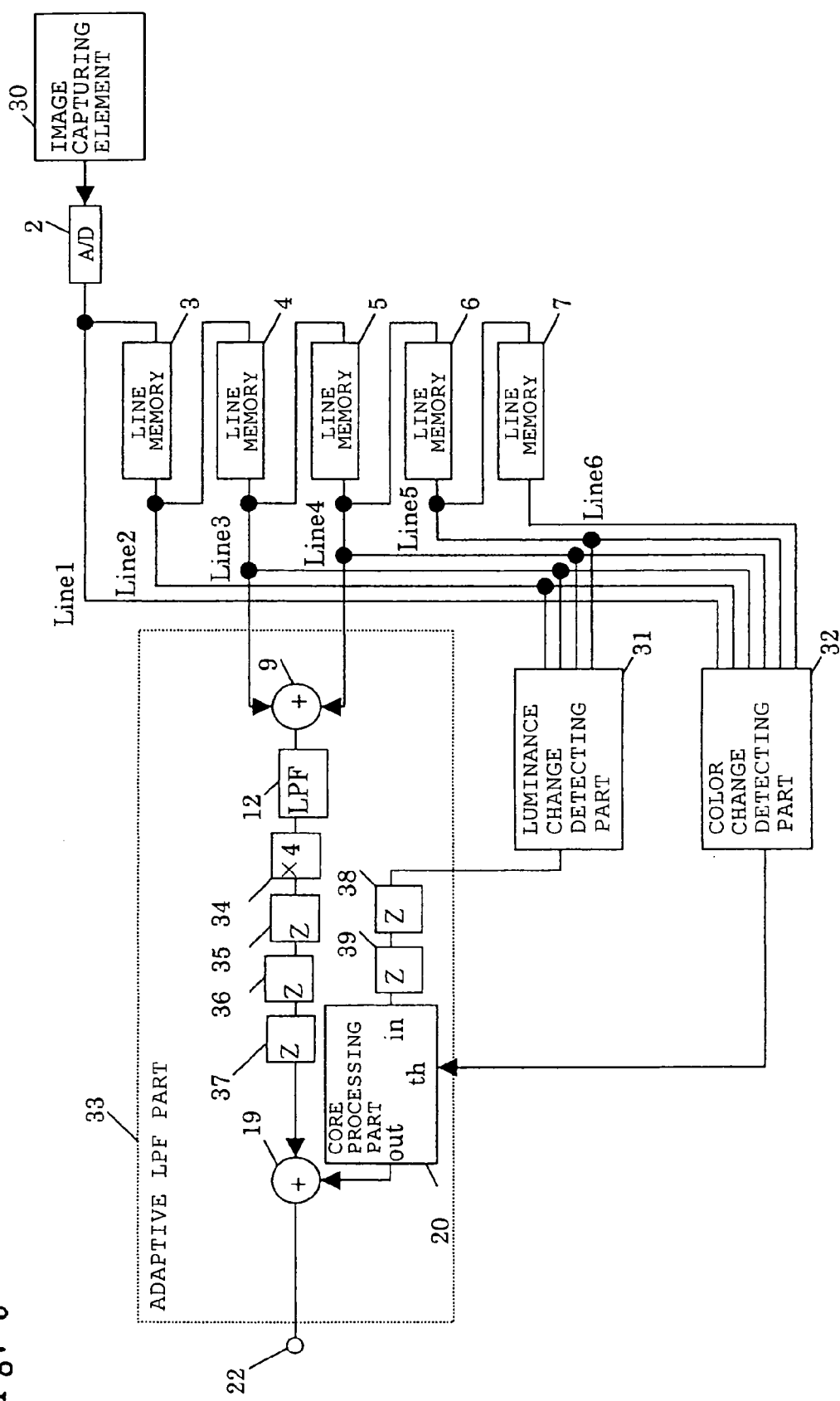
FIG. 9 is a block diagram which shows the structure of an image signal processing apparatus according to a second preferred embodiment of the present invention.

In FIG. 9, denoted at 30 is an image capturing element, denoted at 2 is an A/D conversion part, denoted at 3 through 7 are line memories, denoted at 31 is a luminance change detecting part, denoted at 32 is a color change detecting part, and denoted at 22 is a luminance signal output terminal.

Further, in FIG. 9, denoted at 9 and 19 are adders, denoted at 34 is a multiplier, denoted at 12 is a low-pass filter, denoted at 20 is a core processing part, and denoted at 35 through 39 are 1-pixel delaying parts. These form an adaptive low-pass filter part 33.

The image capturing element 30 corresponds to the image capturing means of the present invention, the color change detecting part 32 corresponds to the color change detecting means of the present invention, and means which includes the adder 19 and the core processing part 20 corresponds to the luminance signal generating means of the present invention.

Operations of the image signal processing apparatus according to this preferred embodiment will now be described.

Figure 10:
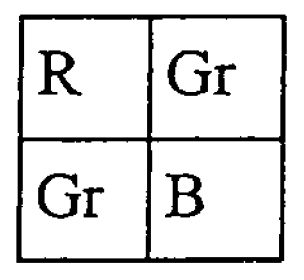

The image capturing element 30 comprises in a surface primary color filters having an arrangement as that shown in FIG. 10, and for every horizontal line, outputs primary color signals of red, green and blue corresponding to the filter colors.

The output signal from the image capturing element 30 is digitized by the A/D conversion part 2, delayed while going through the line memories 3 to 7, and inputted to the adaptive low-pass filter part 33, the luminance change detecting part 31 and the color change detecting part 32.

The luminance change detecting part 31 detects the amount in which the addition value of red and blue has changed.

For instance, FIGS. 13 (a) and (b) show tap coefficients for filtering which is performed on the output from the image capturing element 30 within an output from the luminance change detecting part 31.

When the pixel located at the left top within the illustrated area consisting of four vertical pixels×four horizontal pixels is green, the filter shown in the section (a) is used. Meanwhile, when the pixel located at the left top within this area is red or blue, the filter shown in the section (b) is used.

The filter shown in FIG. 13 is thus a filter for detecting a change of the addition value of red and blue in an oblique direction (diagonal direction).

The output from the luminance change detecting part 31 is fed to the core processing part 20 via the 1-pixel delaying parts 38 and 39.

Inside the core processing part 20, similar processing to that according to the first preferred embodiment described above is executed (See FIG. 3.).

An output from the core processing part 20 is fed to the adder 19 and added to an output from the 1-pixel delaying part 37.

FIG. 14 shows tap coefficients for filtering which is performed on the output from the image capturing element 30 within the output from the 1-pixel delaying part 37 which is shown in FIG. 9.

FIG. 15 shows tap coefficients for filtering which is performed on the output from the image capturing element 30 within the output from the adder 19.

In short, these show changes of the filter tap coefficients of the adaptive low-pass filter part 33 which occur as the relationship between the input signals in and th to the core processing part 20 changes.

To be more specific, FIG. 15(a) shows tap coefficients for where 2×th<|in| is satisfied. Meanwhile, FIGS. 15(b), (c) show tap coefficients for where |in|=1.5×th is satisfied. Further, FIGS. 15(d), (e) show tap coefficients for where |in|≦th is satisfied.

FIGS. 15(b), (d) show tap coefficients for where the pixel located at the left top within the illustrated area consisting of four vertical pixels×four horizontal pixels is green. In the meantime, FIGS. 15(c), (e) show tap coefficients for where the pixel located at the left top within the illustrated area consisting of four vertical pixels×four horizontal pixels is red or blue.

When filtering which utilizes the filters shown in FIGS. 15(d), (e) is performed on a signal shown in FIG. 12, the filter output value is four at any position and it is understood that a signal in which a pseudo signal is suppressed is obtained.

The color change detecting part 32 detects the amount in which a difference value between red and blue has changed.

th is an output from the color change detecting part 32. Hence, the color change detecting part 32 may execute calculations so as to satisfy |in|<th at a color change point where a pseudo signal is generated.

FIG. 16 shows tap coefficients for filtering which is performed on the output signal from the image capturing element 30 within the color change detecting part 32.

Hence, the filter shown in FIG. 16 is thus a filter of detecting a change of the difference value between red and blue in an oblique direction (diagonal direction).

When the pixel in the left top corner of four vertical pixels× eight horizontal pixels is green, filtering which utilizes the filters shown in FIGS. 16(*a*), (*c*) is performed and the color change detecting part 32 outputs the maximum values of the absolute values resulting from the respective filtering.

When the pixel in the left top corner of four vertical pixels× eight horizontal pixels is red or blue, filtering which utilizes the filters shown in FIGS. 16(*b*), (*d*) is performed and the color change detecting part 32 outputs the maximum values of the absolute values resulting from the respective filtering.

For instance, FIG. 11 is a drawing which shows a part of the color filter arrangement which the image capturing element 30 has.

An instance will now be described that the colors of an object change over the diagonal line which links the coordinate (m−2, n−2) and the coordinate (m+3, n+3) which are shown in FIG. 11.

More specifically speaking, an instance will be described that R=R0 and B=B0 are satisfied above and on the right-hand side to points of change while R=R1 and B=B1 are satisfied below and on the left-hand side to the points of change.

In this instance, an output from the color change detecting part 32 around the coordinates (m, n), (m, n+1), (m+1, n) and (m+1, n+1) on the boundary line of the color changes is as expressed by (Formula 9).

(Formula 9)

$$th = \text{Max}(|R(m-3, n+2)-R(m-1, n+2)-R(m+1, n)-R(m+3, n)-B(m-2, n+1)-B(m, n+1)+B(m+2, n-1)+B(m+4, n-1)|, |R(m+1, n+2)+R(m+3, n+2)-R(m-3, n)-R(m-1, n)-B(m+2, n+1)-B(m+4, n+1)+B(m-2, n-1)+B(m, n-1)|) = \text{Max}(|2R|-2R0-2B1+2B0|, |R0-R1-B0+B1|=|2R1-2R0-2B1+2B0|$$

At this stage, the input in to the core processing part 20 is expressed as follows:

(Formula 10)

$$in = R(m-1, n)+R(m+1, n+2)-2R(m+1, n)-2B(m, n+1)+B(m, n-1)+B(m+2, n+1)=2R1-2R0-2B1+2B0$$

Since the relationship |in|≦th is satisfied on the boundary line of the color changes, the adaptive low-pass filter part 33 outputs a signal in which a pseudo signal is suppressed.

Although the foregoing has described an example that there are color changes along the direction from right top toward left below, an example that there are color changes from left top toward right below is also similar.

In this embodiment, low-pass filtering is performed only on the red and the blue components among red, green and blue. For this reason, even when wrong correction has been executed other than on a boundary line of a color change, a high-frequency component of the green component is maintained. Hence, it is possible to minimize a deterioration of the resolution attributed to the wrong correction.

Further, in this embodiment, the output from the color change detecting part 32 is compared with the output from the luminance change detecting part 31 and the characteristic of the adaptive low-pass filter part 33 is accordingly determined.

Hence, even when a change of the brightness of a light source during image capturing of the same object for instance has changed the brightness of the object, both the outputs from the color change detecting part 32 and the luminance change detecting part 31 change in accordance with the brightness of the object. It is therefore possible to perform suitable adaptive low-pass filtering regardless of the brightness of the object.

By means of the structure and the operations above, at the luminance signal output terminal 22, a luminance signal in which a pseudo signal arising at a color change point is suppressed is outputted.

In addition, since a luminance signal is generated using all of red, green and blue in a portion where there is no color change, it is possible to obtain a luminance signal having high resolution even along an oblique direction.

Of course, while the processing at the A/D conversion part 2 and the following parts are realized by hardware in the embodiments described above, all or some of such processing can be realized by software utilizing a micro computer and the like.

A program according to the present invention is a program for making a computer execute all or some steps (or processes, operations, functions, etc.) of the image signal processing method according to the present invention described above, and as such, is a program which operates in co-operation with the computer.

Further, a recording medium according to the present invention is a recording medium which can be read on a computer and which holds such a program which makes a computer execute all or some steps (or processes, operations, functions, etc.) or all or some operations of the image signal processing method according to the present invention described above so that the program when read executes the operation in co-operation with the computer.

In the present invention, "some steps (or processes, operations, functions, etc.)" described above refer to one or some steps among these plurality of steps.

Further, in the present invention, "operations at steps (or processes, operations, functions, etc.)" described above refer to some or all operations at these steps.

An embodiment regarding use of the program according to the present invention may be an embodiment that the program is recorded in a recording medium which can be read on a computer and which operates in co-operation with the computer.

An embodiment regarding use of a program according to the present invention may be an embodiment that a program is transmitted through a transmission medium and read on a computer so that the program operates in co-operation with the computer.

The recording medium includes a ROM, etc., whereas a transmission medium includes a transmission medium such as the Internet, light, an electric wave, a sound wave, etc.

The computer referred to above in relation to the present invention is not limited to pure hardware such as a CPU but may include firmware, OS and even peripheral equipment.

As described above, the structure according to the present invention may be realized by software or hardware.

The present invention has an advantage that it is possible to obtain a luminance signal in which occurrence of a pseudo signal is better suppressed.

The invention claimed is:

1. An image signal processing apparatus, comprising:
   image capturing means of performing image capture using a plurality of types of color filters which are arranged based on repetition of a pattern determined in advance;

color change detecting means of performing color change detection regarding the result of said image capture;

luminance change detecting means of performing luminance change detection regarding the result of said image capture; and luminance signal generating means of performing luminance signal generation regarding the result of said image capture based on a comparison between the result of said color change detection and the result of said luminance change detection, wherein said color change detection is performed with respect to a predetermined direction corresponding to said pattern, and a dot-like pseudo signal is generated in said luminance signal at a color change point and is suppressed at said color change point where the result of said color change detection exceeds a predetermined level regarding the result of said luminance change detection.

2. The image signal processing apparatus of claim 1, wherein said pattern is a pattern having two pixels in the horizontal direction and four pixels in the vertical direction so as to arrange a color filter of magenta and a color filter of green in this order on a first line in the horizontal direction, a color filter of yellow and a color filter of cyan in this order on a second line in the horizontal direction, a color filter of green and a color filter of magenta in this order on a third line in the horizontal direction and a color filter of yellow and a color filter of cyan in this order on a fourth line in the horizontal direction, and said predetermined direction is the horizontal direction.

3. The image signal processing apparatus of claim 2, wherein said color change detection is performed in accordance with a change of said magenta in the horizontal direction and a change of said green in the horizontal direction.

4. The image signal processing apparatus of claim 3, wherein said color change detection is performed further in accordance with a change of said yellow in the vertical direction and a change of said cyan in the vertical direction.

5. The image signal processing apparatus of claim 3, wherein said color change detection is performed further in accordance with a change of said magenta in the vertical direction and a change of said green in the vertical direction.

6. The image signal processing apparatus of claim 1, wherein said pattern is a pattern having two pixels in the horizontal direction and two pixels in the vertical direction so as to arrange a color filter of red and a color filter of green in this order on a first line in the horizontal direction and a color filter of green and a color filter of blue in this order on a second line in the horizontal direction, and said predetermined direction is the direction of a diagonal line.

7. The image signal processing apparatus of claim 6, wherein said color change detection is performed in accordance with a change of said red in the direction of the diagonal line and a change of said blue in the direction of the diagonal line.

8. The image signal processing apparatus of claim 6, wherein calculation for suppression of said pseudo signal is performed in accordance with a change of said red in the direction of the diagonal line and a change of said blue in the direction of the diagonal line.

9. The image signal processing apparatus of claim 1, wherein the result of said color change detection is a value, and the result of said luminance change detection is a value.

10. An image signal processing circuit, comprising:

color change detecting means of performing color change detection regarding the result of image capture which is performed using a plurality of types of color filters which are arranged based on repetition of a pattern determined in advance;

luminance change detecting means of performing luminance change detection regarding the result of said image capture; and luminance signal generating means of performing luminance signal generation regarding the result of said image capture based on a comparison between the result of said color change detection and the result of said luminance change detection, wherein said color change detection is performed with respect to a predetermined direction corresponding to said pattern, and a dot-like pseudo signal is generated in said luminance signal at a color change point and is suppressed at said color change point where the result of said color change detection exceeds a predetermined level regarding the result of said luminance change detection.

11. The image signal processing circuit of claim 10, wherein the result of said color change detection is a value, and wherein the result of said luminance change detection is a value.

12. An image signal processing method, comprising:

a color change detecting step of performing color change detection regarding the result of image capture which is performed using a plurality of types of color filters which are arranged based on repetition of a pattern determined in advance;

a luminance change detecting step of performing luminance change detection regarding the result of said image capture; and a luminance signal generating step of performing luminance signal generation regarding the result of said image capture based on a comparison between the result of said color change detection and the result of said luminance change detection, wherein said color change detection is performed with respect to a predetermined direction corresponding to said pattern, and a dot-like pseudo signal is generated in said luminance signal at a color change point and is suppressed at said color change point where the result of said color change detection exceeds a predetermined level regarding the result of said luminance change detection.

13. The image signal processing method of claim 12, wherein the result of said color change detection is a value, and the result of said luminance change detection is a value.

14. A recording medium which holds a program and which can be processed on a computer, the program making a computer execute a color change detecting step of performing color change detection regarding the result of image capture which is performed using a plurality of types of color filters which are arranged based on repetition of a pattern determined in advance, a luminance change detecting step of performing luminance change detection regarding the result of said image capture, and a luminance signal generating step of performing luminance signal generation regarding the result of said image capture based on a comparison between the result of said color change detection and the result of said luminance change detection, wherein said color change detection is performed with respect to a predetermined direction corresponding to said pattern, and a dot-like pseudo signal is generated in said luminance signal at a color change point and is suppressed at said color change point where the result of said color change detection exceeds a predetermined level regarding the result of said luminance change detection.

15. An image signal processing apparatus, comprising:

an image capturing element operable to perform image capture using a plurality of types of color filters which are arranged based on repetition of a pattern determined in advance;

a color change detector operable to perform color change detection regarding the result of said image capture;

a luminance change detector operable to perform luminance change detection regarding the result of said image capture; and a luminance signal generator operable to perform luminance signal generation regarding the result of said image capture based on a comparison between the result of said color change detection and the result of said luminance change detection, wherein said color change detection is performed with respect to a predetermined direction corresponding to said pattern, and a dot-like pseudo signal is generated in said luminance signal at a color change point and is suppressed at said color change point where the result of said color change detection exceeds a predetermined level regarding the result of said luminance change detection.

* * * * *

UNITED STATES PATENT AND TRADEMARK OFFICE
CERTIFICATE OF CORRECTION

PATENT NO. : 7,499,086 B2
APPLICATION NO. : 10/510291
DATED : March 3, 2009
INVENTOR(S) : Yukihiro Tanizoe et al.

It is certified that error appears in the above-identified patent and that said Letters Patent is hereby corrected as shown below:

<u>Title Page</u>

At item (57) ABSTRACT, on line one, "comprises" should read -- includes --.

At item (57) ABSTRACT, on line 6, "capturing" should read -- captured --.

At item (57) ABSTRACT, on line 8, "capturing" should read -- captured --.

<u>Column 16</u>

On line 30, claim 11 delete "wherein".

Signed and Sealed this

Thirtieth Day of June, 2009

JOHN DOLL
*Acting Director of the United States Patent and Trademark Office*